Nov. 28, 1967 S. V. ALEXANDERSSON 3,355,691

RESISTOR COMPONENT AND RESISTOR COMPRISING SEVERAL SUCH RESISTOR COMPONENTS

Filed June 24, 1965

INVENTOR.
SVEN VIKTOR ALEXANDERSSON

BY Hane and Nydick

ATTORNEYS

3,355,691
RESISTOR COMPONENT AND RESISTOR COMPRISING SEVERAL SUCH RESISTOR COMPONENTS

Sven Viktor Alexandersson, Enskede, Sweden, assignor to Telefonaktiebolaget L M Ericsson, Stockholm, Sweden, a corporation of Sweden Filed June 24, 1965, Ser. No. 466,577
Claims priority, application Sweden, July 29, 1964, 9,178/64
10 Claims. (Cl. 338—47)

ABSTRACT OF THE DISCLOSURE

A resistor component which can be used for signal switching. The component comprises first and second wirelike elements. One of the elements comprises a substrate of conductive material and a layer of resistance material which changes its resistance properties in accordance with the amplitude and waveform of the voltage and/or current applied thereto. A ring-shaped holder means supports the wirelike elements in an intersecting relationship with the elements pressing against each other with a given pressure. There are further disclosed groups of these elements woven in matrixlike arrays to povide the core of a switching matrix.

This invention relates primarily to a resistor component comprising a resistance layer arranged on a substrate and a first connection device arranged on the substrate and a second connection device resting against the resistance layer. Such known resistor components have the property of changing from a high ohmic condition to a low ohmic condition when the voltage over them exceeds their firing voltage and of changing from a low ohmic condition to a high ohmic condition when the current through them decreases to zero or to remain in low ohmic condition when the current through them decreases to zero from a certain normal value but change to a high ohmic condition when the current decreases to zero from a value essentially exceeding said normal value, see for example the Swedish patent (patent application 10,575/63).

In practice it has shown to be very important that the said second connection device rests against the resistance layer with a certain required pressure for each case. This invention refers to resistor components so arranged that the said demand can easily be realized and further to resistors built up of several such resistor components. A resistor component arranged in accordance with the invention contemplates a wirelike substrate having a current-sensitive resistance layer and a wirelike connection device. A ring-shaped holder supports the wirelike substrate and the wirelike connection device in an intersecting relationship so that they rest against each other with a certain required pressure.

Figure 1:
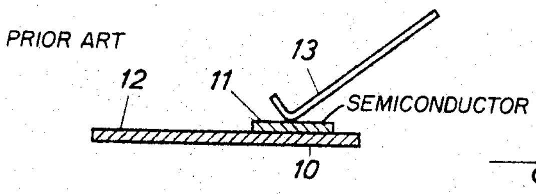
Figure 2:
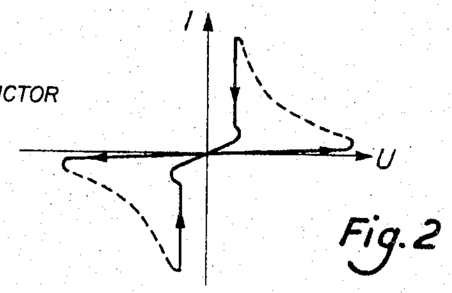
Figure 3:
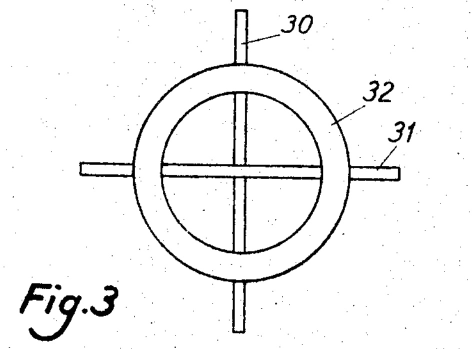
Figure 5:
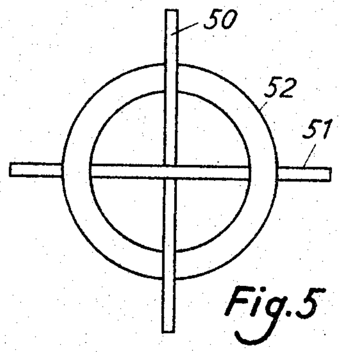
Figure 4:
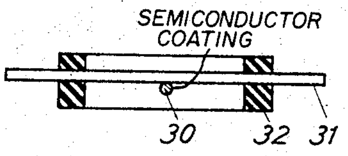
Figure 6:
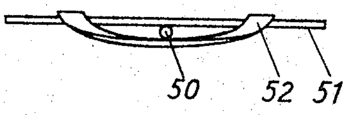
Figure 7:
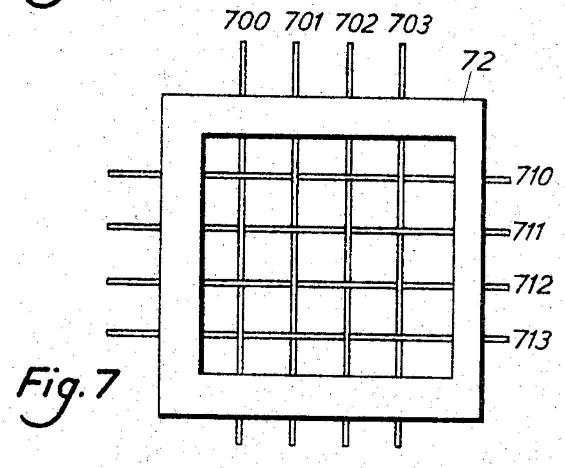
Figure 8:
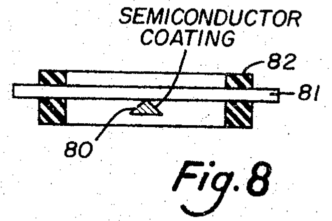

The invention will be more fully described in connection with the accompanying drawing wherein: FIG. 1 shows a prior art resistor component; FIG. 2 shows the current-voltage characteristic for a resistor component according to FIG. 1; FIG. 3 shows a plan view of a single resistor component utilizing a rigid ring-shaped holder in accordance with one embodiment of the invention; FIG. 4 is a sectional view of the component of FIG. 3; FIG. 5 is a plan view of a single resistor component utilizing an elastic ring-shaped holder in accordance with another embodiment of the invention; FIG. 6 is a side view of the component of FIG. 5; FIG. 7 shows a resistor array employing several resistor components of the invention; and FIG. 8 shows a modification of the embodiment of FIGS 3 and 4.

The resistor component according to FIG. 1 comprises a substrate 10; a resistance layer 11 on a portion of substrate 10; a first connection device 12 connected to substrate 10 and shown as a direct extension of the substrate; and a second connection device 13 resting against the resistance layer 11. The substrate 10 may be of stainless steel, the resistance layer may consist of 47% tellurium, 47% germanium, 5% arsenic and 1% silicon, and the connection device 13 may be of molybdenum. A resistor component of said kind has a current-voltage characteristic in accordance with the one shown in FIG. 2.

FIGS. 3 and 4 show the substrate and its associated resistance layer in the form of a wirelike element or thread 30 and the second connection device in the form of a wirelike element or thread 31. Thread 30 intersects or crosses thread 31. The two threads 30 and 31 are fastened in a ring shaped holder 32 so that they rest against each other with a certain required pressure. The holder 32 is intended to be stiff and is provided with holes for the threads 30 and 31. The holes are so positioned with respect to each other that the combination of the placing of the holes and the elastic properties of the threads gives the pressure required for every certain case.

A modification of the said resistor component is shown in FIGS. 5 and 6. From these figures is evident that the threads 50 and 51 are stiff while the holder 52 is elastic.

It should be realized that the threads 31 and 51 as well as the threads 30 and 50 of the two embodiments can be covered with resistance material.

FIG. 7 shows a resistor comprising several resistor components according to the teaching of FIGS. 3 and 4. The holder 72 is shown as a square annulus. Between two opposite sides of the square holder 72 there are fastened a number of threads 700, 701 . . . 703. Each consists of a substrate, its associated resistance layer and a connection device which is an extension of the substrate. Between the two remaining sides there are fastened a number of threads 710, 711 . . . 713 which cross and elasticly rest against alternating the upper side and the lower side of the first mentioned threads 700 . . . 703. The threads 710 . . . 713 may constitute only connection devices or they may also consist of substrate with associated resistance layers and connection devices. With the resistor now described it is possible to obtain different resistance combinations by a suitable choice of input and output wires.

For an accurate fixing of the contact point between two mutually crossing threads these may have a triangular section area. This appears from FIG. 8.

When the threads of a resistor component or a resistor are inserted in the intended manner in the associated circuit holder it is desirable to pot the combination in a mechanically protecting cover, for example epoxy resin, in such a manner that the ends of the threads are easy to reach.

The embodiments have many features in common. In particular, the wirelike elements or threads 30, 50, **70*n* and 80 have substrates of conductive material and a layer of the above described resistance material. At least one end of each of these elements can be free of the resistance material to provide a terminal. The wirelike elements or threads 31, 51, 71*n* and 81 can be of completely conductive material. At least one end of each of these elements can be an electrical terminal. The holders 32, 53, 72 and 82** are of insulative material.

For each of the components a switching path is established between the terminal of a resistance layered substrate thread and the terminal of the conductive thread. For example, in FIG. 3, assuming the top of thread 30 and the right end of thread 31 are the terminals. Then a possible signal path is set up between these terminals due to the pressure abutting of these threads at their point of intersection. The path is opened or closed depending on the waveform of the voltage and current passing through these terminals.

In FIG. 7, there are many possible signal paths. There is a possible path from the terminals of each of the threads 700 to the terminals of each of the threads 710. There is also a possible path from the terminal of thread 700 to the terminals of each of the threads 710, 711, 712 and 713. The actual path set up would depend on which of the terminals 710, 711, 712 and 713 is set up to cooperate with the terminal of thread 700 to receive the required current waveform. Thus, it is seen that the embodiment of FIG. 7 is a two-dimensional switching matrix.

I claim:

1. A switching component switchable between states of low and high resistance, said component comprising first and second wirelike elements of electrically conductive material, and means for supporting said elements in intersecting abutting relationship, whereby said elements rest against each other under pressure, at least one of said wirelike elements having a layer of semi-conducting material which changes state in response to the waveform of electrical energy applied thereto, at least one end of each of said wirelike elements being adapted to be connected to an electrical circuit.

2. A resistor component comprising first and second wirelike elements, at least one of said elements comprising a substrate of conductive material and a layer of electrical energy sensitive resistance material, and a ring-shaped holder means for supporting said wirelike elements in an intersecting relationship with the elements pressing against each other with a required pressure, at least one end of each of said elements being adapted to be connected to an electrical circuit.

3. The resistor component of claim 2, wherein said ring-shaped holder means is rigid and said wirelike elements are resilient so as to elastically rest against each other.

4. The resistor component of claim 2, wherein said wirelike elements are rigid and said ring-shaped holder means is resilient for urging said wirelike elements against each other with a required pressure.

5. The resistor component of claim 2, wherein at least one of said wirelike elements has a triangular cross section.

6. A resistor comprising a square holder frame means having two pairs of oppositely disposed sides, a first plurality of wirelike elements extending between one pair of said sides, and a second plurality of wirelike elements extending between the other pairs of said sides, said second plurality of wirelike elements being disposed to cross and resiliently rest against the wirelike elements of said first plurality in an interwoven manner, each of the wirelike elements of said first plurality including a substrate of conductive material and a layer of resistance material, and each of the wirelike elements of said second plurality being of conductive material, at least one end of each of said wirelike elements being adapted to be connected to an electrical circuit.

7. A resistor comprising a square holder frame means having two pairs of oppositely disposed sides, a first plurality of wirelike elements extending between one pair of said sides, and a second plurality of wirelike elements being disposed to cross and resiliently rest against the wirelike elements of said first plurality in an interwoven manner, at least some of the wirelike elements in each plurality including a substrate of conductive material and a layer of resistance material, at least one end of each of said wirelike elements being adapted to be connected to an electrical circuit.

8. A resistor comprising a square holder frame means having two pairs of oppositely disposed sides, a first plurality of wirelike elements extending between one pair of said sides, and a second plurality of wirelike elements extending between the other pair of said sides, said second plurality of wirelike elements being disposed to cross and resiliently rest against the wirelike elements of said first plurality in an interwoven manner, each of the wirelike elements of said first and second pluralities including a substrate of conductive material and a layer of resistance material, at least one end of each of said wirelike elements being adapted to be connected to an electrical circuit.

9. The resistor of claim 6 and further comprising means for supporting said holder means and said wirelike elements in a mechanically protective potting material with the ends of said elements being exposed.

10. A resistor component comprising first and second wirelike elements of electrically conductive material, and means for supporting said elements in an intersecting abutting relationship, whereby said elements rest against each other under pressure, at least one of said wirelike elements having a layer of current-sensitive semiconductor material in the region thereof that abuts the other of said wirelike elements, at least one end of each of said wirelike elements being adapted to be connected to an electrical circuit.

References Cited

UNITED STATES PATENTS

| | | | |
|---|---|---|---|
| 3,209,298 | 9/1965 | Evanicsko | 200—166 X |
| 1,240,797 | 9/1917 | Tatum | 388—291 X |
| 2,285,339 | 6/1942 | Larson | 388—325 X |
| 2,931,877 | 4/1960 | Henley | 338—99 X |
| 2,938,992 | 5/1960 | Crump | 338—208 X |
| 3,218,436 | 11/1965 | Edwards et al. | 338—208 X |

RICHARD M. WOOD, *Primary Examiner.*

J. G. SMITH, *Assistant Examiner.*